United States Patent [19]

Edwards

[11] 4,208,860
[45] Jun. 24, 1980

[54] CROP HARVESTING APPARATUS

[75] Inventor: John W. Edwards, Brandon, Fla.

[73] Assignee: Ginny Bee Harvester Corporation, Tampa, Fla.

[21] Appl. No.: 733,374

[22] Filed: Oct. 18, 1976

Related U.S. Application Data

[63] Continuation-in-part of Ser. No. 570,718, Apr. 23, 1975, Pat. No. 3,992,861, which is a continuation-in-part of Ser. No. 508,903, Sep. 24, 1974, abandoned, which is a continuation-in-part of Ser. No. 410,262, Oct. 26, 1973, abandoned, which is a continuation-in-part of Ser. No. 386,421, Aug. 7, 1973, abandoned, which is a continuation-in-part of Ser. No. 362,453, May 21, 1973, abandoned, which is a continuation-in-part of Ser. No. 350,168, Apr. 11, 1973, abandoned, which is a continuation-in-part of Ser. No. 339,914, Mar. 9, 1973, abandoned.

[51] Int. Cl.² ............................................ A01D 46/20
[52] U.S. Cl. ............................................ 56/328 R
[58] Field of Search ............................ 56/328 R, 330

[56] References Cited

U.S. PATENT DOCUMENTS

| | | | |
|---|---|---|---|
| 3,222,855 | 12/1965 | Lasswell, Jr. | 56/328 R |
| 3,462,930 | 8/1969 | Clark | 56/328 R |
| 3,483,687 | 12/1969 | Tanner, Jr. | 56/328 R |
| 3,543,492 | 12/1970 | Nixon | 56/328 R |
| 3,601,962 | 8/1971 | Townsend | 56/328 R |
| 3,701,242 | 10/1972 | Townsend | 56/328 R |
| 3,705,486 | 6/1971 | Chen et al. | 56/328 R |
| 3,813,860 | 6/1974 | Cecchi | 56/328 R |
| 3,864,899 | 2/1975 | Lasswell | 56/328 R |
| 3,948,027 | 4/1976 | Edwards | 56/328 R |

FOREIGN PATENT DOCUMENTS 194461 9/1967 U.S.S.R. ............................. 56/328 R

Primary Examiner—Russell R. Kinsey
Assistant Examiner—John J. Wilson
Attorney, Agent, or Firm—Bernard & Brown

[57] ABSTRACT

A crop harvesting apparatus having a plurality of rotatable crop-severing rods of generally circular cross section extending from a support for insertion into crop-bearing foliage with the crop-severing rod longitudinal axes substantially parallel to the direction of thrust. In one embodiment of the present invention, the rods are formed of a rigid, flexible material and are rotated at speeds sufficient to cause the rods to flex to rotate orbitally about the stationary positions of their longitudinal axes. In a second embodiment, the crop-severing rods have frictional surfaces on at least the longitudinally outer portions thereof. These crop-severing portions of the rods have no significant abrupt enlargement of diameter, and so no bulges exist which might contact and sever immature fruit or foliage from a crop-bearing plant. The rods are rotated and are thrust into a crop-bearing plant, and the frictional surfaces contact the crops to remove the mature crops from the plant.

37 Claims, 11 Drawing Figures

U.S. Patent  Jun. 24, 1980  Sheet 1 of 2  4,208,860
FIG. 1
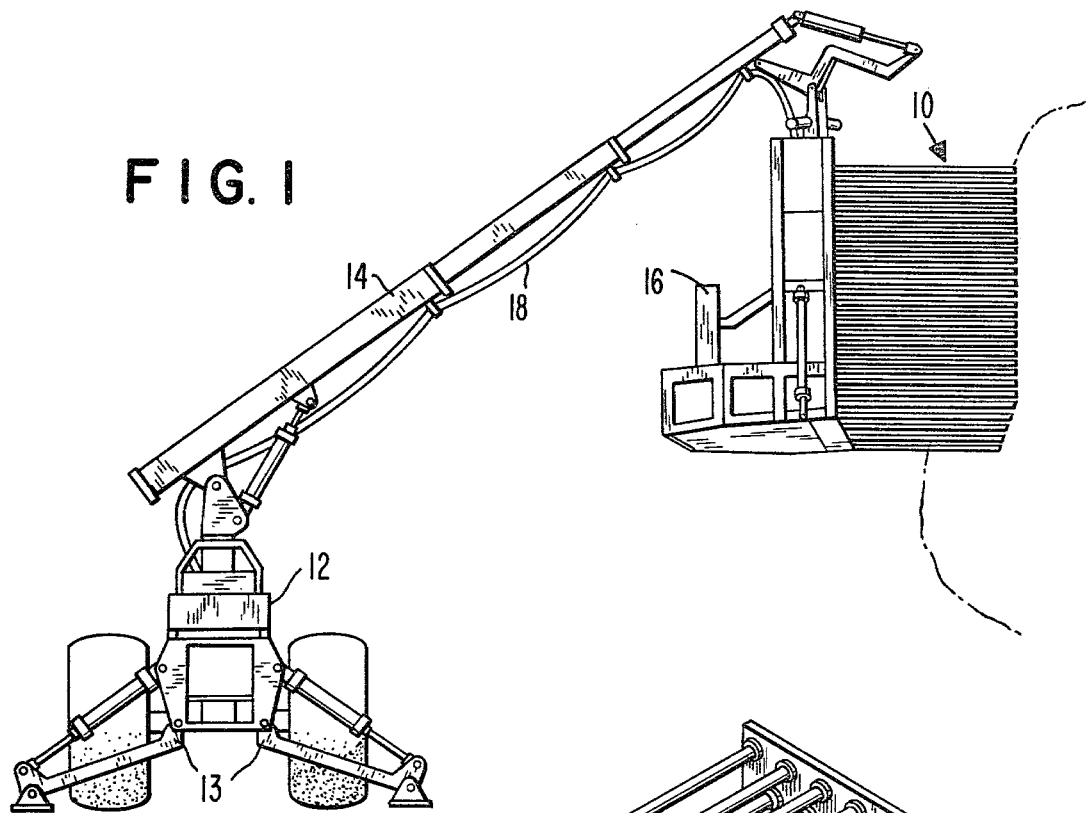
FIG. 2
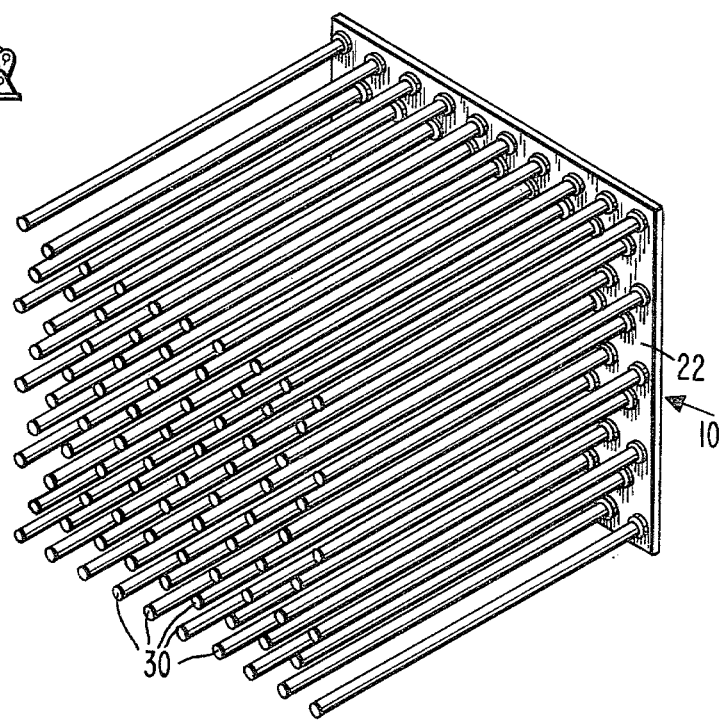
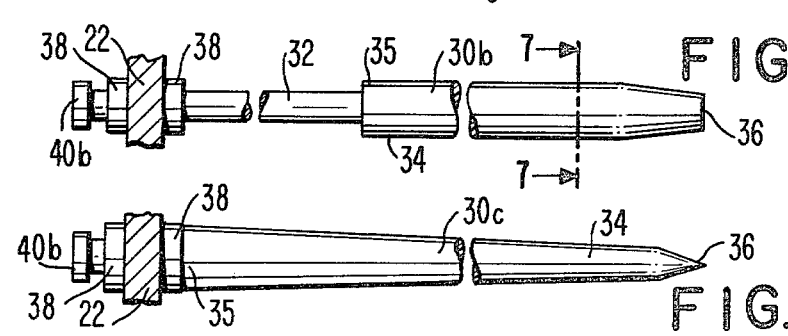
FIG. 7
FIG. 6
FIG. 8

CROP HARVESTING APPARATUS

This application is a continuation-in-part of U.S. patent application Ser. No. 570,718, filed Apr. 23, 1975, now U.S. Pat. No. 3,992,861, which is a continuation-in-part of U.S. patent application Ser. No. 508,903, filed Sept. 24, 1974 and now abandoned, which, in turn, was a continuation-in-part of U.S. patent application Ser. No. 410,262, filed Oct. 26, 1973, and now abandoned, which, in turn, is a continuation-in-part of U.S. patent application Ser. No. 386,421, filed Aug. 7, 1973, and now abandoned, which was a continuation-in-part of U.S. patent application Ser. No. 362,453, filed May 21, 1973 and now abandoned, which, in turn, was a continuation-in-part of U.S. patent application Ser. No. 350,168, filed Apr. 11, 1973, now abandoned, which was a continuation-in-part of U.S. patent application Ser. No. 339,914, filed Mar. 9, 1973, and now abandoned.

The present invention pertains to a crop harvesting apparatus. More particularly, the present invention pertains to an automated apparatus for the mechanized harvesting of crops, in particular, tree-borne crops such as fruits, nuts and the like.

At the present time, many tree-borne crops such as fruit and nuts are harvested by hand. While attempts have been made to perfect mechanized crop harvesting apparatus, these have not been wholly successful heretofore. Many such apparatus either have caused damage to the crop-bearing plant or to the crop itself, or they have been unable to pick crops with great enough efficiency to be economically successful. A fruit tree must not be damaged to any extent during the harvesting of its fruit, or the tree will yield less fruit in subsequent crops. Thus, mechanized fruit harvesting apparatus must be capable of removing the fruit from the trees without removing an excessive quantity of leaves and branches. Removal of even a small quantity of leaves and branches is undesirable, even though that may not cause appreciable damage to the trees, since such leaves and branches must be removed from among the fruit before marketing. Likewise, the fruit itself must not be damaged to any great extent if it is to be marketable. While fruit which is intended for processing need not be in perfect condition, still, it cannot be damaged excessively or it will be unsuited even for processing. Accordingly, the fruit harvesting must be done without excessive damage to the crop. Citrus fruit of the Valencia variety stays on the tree over a year to ripen. As a consequence, at the time the fruit is harvested, the Valencia fruit tree is bearing both unripened, immature fruit of the new crop and ripened, mature fruit of the crop to be harvested. A crop harvesting device must be capable of picking the mature Valencia fruit while leaving the immature fruit.

U.S. Pat. No. 3,646,741, issued Mar. 7, 1972 to John W. Edwards et al., discloses a crop harvesting apparatus overcoming many of the problems of prior crop harvesting devices. The apparatus disclosed in that patent includes an elongated hollow cylindrical shell having a plurality of crop-entry openings for the entry of the crop such as fruit and nuts, with the openings terminating in a crop-severing edge. The shell is thrust lengthwise among the crop-bearing foliage and rotated, removing crops from the plants. The crop-entry openings are provided with a closure or door to prevent mature, ripened fruit from leaving the shell via the crop-entry opening, while permitting immature, green fruit, leaves and branches to pass out the crop-entry opening without being severed from the plant. Although the apparatus disclosed in U.S. Pat. No. 3,646,741 performs better than previously available mechanized crop harvesting devices, still, shortcomings exist. The closures or doors on the crop-entry openings slow operation of the apparatus. While the apparatus does not remove so many leaves from the trees as to cause appreciable damage to the trees, still some leaves are removed and mixed with the harvested crops. This necessitates separating these leaves from the crops before marketing of the crops.

The several United States patent applications of which the present application is a continuation-in-part likewise show improved crop harvesting apparatus, generally including rotatable crop-severing rods. Several forms of these crop harvesting apparatus mount the rotatable crop-severing rods so that the rods are thrust among the limbs of the crop-bearing plant with the rotatable rod longitudinal axes being generally transverse or perpendicular to the direction of thrust. Others of these crop harvesting apparatus mount the rotatable crop-severing rods so that the rods are thrust end-first into the crop-bearing plants i.e. with the direction of thrust being generally parallel with the rods longitudinal axes. The rods are mounted for rotation about axes offset from and generally parallel to their longitudinal axes so that the rods rotate orbitally. While these several forms of crop harvesting apparatus have provided improved performance, subsequent experimentation has resulted in still further improved crop harvesting apparatus.

The present invention is an improved crop harvesting apparatus in which rotating crop-severing rods of generally circular cross section are thrust among the limbs of the crop-bearing plants with the longitudinal axes of the crop-severing rods directed toward the plants and substantially parallel to the direction of thrust. In one embodiment of the present invention, the rods are formed of a rigid, flexible material and are rotated at speeds sufficient to cause the rods to flex to rotate orbitally about the stationary positions of their longitudinal axes. In a second embodiment, the crop-severing rods have frictional surfaces on at least the longitudinally outer portions thereof. These crop-severing portions of the rods have no significant, abrupt enlargement of diameter, and so no bulges exist which might contact and sever immature fruit or foliage. Advantageously an outer end portion of the crop-severing rods can be tapered, or if desired up to an entire rod can be tapered, especially from a larger diameter at a longitudinally inner portion thereof to a smaller diameter at a longitudinally outer portion thereof. As the crop-severing rods rotate, they engage and remove the mature crops from the plants without removing an appreciable amount of leaves or branches or immature crops.

If desired, the crop-severing rods can be mounted within crop catching rods which form a crop storage basket. Alternatively, any of various known catch frames or other crop-gathering techniques can be used in conjunction with the crop-severing rods of the present invention. Preferably, the crop harvesting apparatus is mounted on a self-propelled vehicle, for example at the end of a horizontally rotatable, vertically pivotable, telescoping boom which permits insertion of the crop-severing rods among the foliage of a crop-bearing plant.

These and other aspects and advantages of the present invention are more apparent in the following detailed description, particularly when considered in conjunction with the accompanying drawings in which like parts bear like reference numerals. In the drawings:

FIG. 1 is a perspective view of a crop harvesting apparatus in accordance with the present invention mounted on a suitable vehicle ready for the harvesting of tree-borne crops;

FIG. 2 is an enlarged perspective view illustrating a preferred embodiment of crop harvesting apparatus in accordance with the present invention;

FIG. 6 is an enlarged, broken, partially sectional view depicting a second embodiment of crop-severing rods suitable for incorporation into a crop harvesting apparatus in accordance with the present invention;

FIG. 7 is a sectional view taken along line 7—7 of FIG. 6;

FIG. 8 is an enlarged, broken, partially sectional view depicting various alterations in crop-severing rods which are suitable for incorporation into a crop harvesting apparatus in accordance with the present invention;

Figure 3:
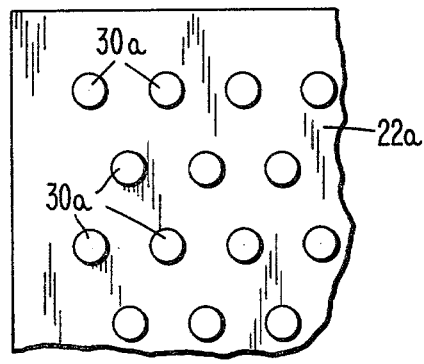
FIG. 3 is a fragmentary elevational view depicting the mounting of crop-severing rods in a first relationship on a crop harvesting apparatus in accordance with the present invention.

FIG. 1 depicts a crop harvesting apparatus 10 in accordance with the present invention, mounted on a self-propelled vehicle 12 for the harvesting of crops. Vehicle 12 can be any suitable vehicle for propelling crop harvesting apparatus 10 through the crop-bearing plants, and the details of vehicle 12 are not critical to the present invention. For purposes of illustration, vehicle 12 is depicted as a tractor having a plurality of stabilizing legs 13. Crop harvesting apparatus 10 is suspended from one end of an extendible boom 14 which is mounted on vehicle 12 in a manner permitting boom 14 to rotate in a horizontal plane and to pivot in a vertical plane. An operator's station 16 is provided, preferably adjacent crop harvesting apparatus 10, as depicted in FIG. 1, although operator's station 16 may be located elsewhere, such as on tractor 12 or at the tractor end of boom 14. Operator's station 16 includes controls for crop harvesting apparatus 10 and for vehicle 12; however, if desired these two sets of controls could be at two different locations, e.g. controls for crop harvesting apparatus 10 at a location adjacent the crop harvesting apparatus, and controls for vehicle 12 at the vehicle. Preferably, however, all the controls are at a single location so that a single operator can control the crop harvesting apparatus and the vehicle without having to change locations. In the preferred embodiment, depicted in FIG. 1, in which all controls are at operator's station 16 adjacent crop harvesting apparatus 10, the controls at operator's station 16 are coupled to tractor 12 by means of cables 18, which run along boom 14, so that the operator at station 16 can control both the operation of crop harvesting apparatus 10 and the movement of tractor 12.

As illustratively depicted in FIGS. 2 and 3, crop harvesting apparatus 10 includes a plurality of crop-severing rods 30 which are rotatably mounted on planar support plate 22 so that the crop-severing rod longitudinal axes extend substantially normal to the plane defined by plate 22. Movement of crop harvesting apparatus 10 toward a crop-bearing plant results in the crop-severing rods 30 moving substantially parallel to their longitudinal axes as the rods are thrust among the crop-bearing foliage.

Figure 4:
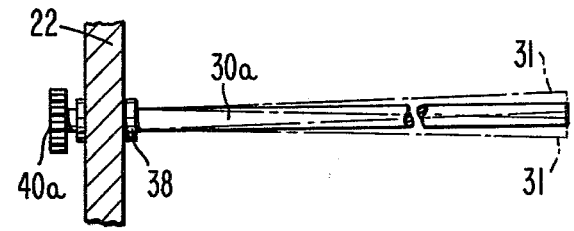
FIG. 4 is an enlarged, broken, partially sectional view depicting a first embodiment of crop-severing rods suitable for incorporation into a crop harvesting apparatus in accordance with the present invention.
Figure 5:
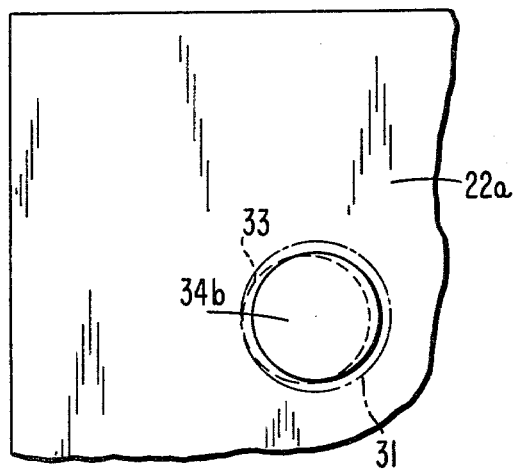
FIG. 5 is an enlarged, fragmentary front elevational view of a crop-severing rod of FIG. 4, illustrating operation thereof.

FIGS. 4 and 5 depict a first embodiment of crop severing rods 30a suitable for incorporation into a crop harvesting device 10 in accordance with the present invention. The crop severing rods 30a are mounted from support plate 22 with their longitudinal axes substantially perpendicular to the plane defined by plate 22. Each crop-severing rod 30a is of a generally circular cross section with a diameter in the order of about one and one-half inches and a length in the order of about four to about eight feet. As many as one hundred fifty or more crop-severing rods 30a may be mounted on support plate 22, spaced, for example, on four inch centers.

The crop-severing rods 30a are formed of a rigid, flexible material. By "rigid, flexible material" is meant a material which has sufficient strength and rigidity to sever crops from crop-bearing foliage when actuated therein, yet which, at operating speeds, flexes slightly to cause the rods 30a to rotate orbitally about their stationary positions, say at speeds in the order of from about 1000 RPM to about 3000 RPM. Suitable materials include synthetic resinous compositions such as polyolefins, for example polypropylene and polyethylene, acrylate and methacrylate-containing polymers, and glass-fiber containing materialss. A preferred material is a thermoplastic polycarbonate such as that available commercially from General Electric Company under the trademark LEXAN.

When rigid, flexible crop-severing rods 30a are rotated at operating speeds, they flex slightly. As a consequence, rather than rotating about its own axis, each rigid, flexible crop-severing rod 30a rotates orbitally about the stationary or rest position of its longitudinal axis. In FIGS. 4 and 5 the rest position of one rigid, flexible crop-severing rod 30a is depicted in solid line, while its orbital path of rotation is depicted by long-dash outline 31. With a rigid, flexible crop-severing rod 30a having a diameter in the order of about one and one-half inches, this flexing might offset the rod a distance in the order of about one-fourth inch from its rest position. Short-dash outline 33 in FIG. 5 depicts an instantaneous position of rigid, flexible rod 30a as it flexes in orbital path 31.

FIGS. 6 and 7 illustrate a second embodiment of crop-severing rod 30b which includes a central support member 32 and a frictional surface 34. As seen in FIG. 7, crop-severing rod 30 has a generally circular cross section, and advantageously both central support member 32 and frictional surface 34 may have a generally circular cross section as also depicted in FIG. 7. Preferably, rod 30b has sufficient flexibility so that should a rod 30b contact a large branch on a crop-bearing tree or other obstacle, the rod will flex as necessary around the branch without significantly damaging either the tree or the rod. Central support member 32 can be formed of any suitable material and so may be a metal such as, for example, a fatigue-free spring steel, e.g. an aircraft tubing, or may be a synthetic resinous composition. Advantageously, a synthetic resinous material including strength-enhancing additives such as glass fibers, etc., may be used for central support member 32.

Frictional surface 34 is be formed of a material having a friction characteristic sufficient to apply a force to mature crops as those crops are contacted by rotating rods 30b adequate to sever the mature crops from the crop-bearing plant. By way of example, frictional surface 34 may be a moderately hard rubber material. Surface 34 can be applied to central support member 32 in any of several manners, for example by extruding frictional surface 34 onto central support member 32 while the material of frictional surface 34 is still hot and flexible, with the frictional surface 34 being attached to central support member 32 in a manner which prevents separate rotational movement of these components, e.g. by glue. Illustratively central support member 32 may have a diameter in the order of about one inch, while frictional surface 34 may have a thickness in the order of about one-half inch, giving an overall diameter in the order of about two inches. Crop-severing rod 30b might have an overall length in the order of about six feet, with frictional surface 34 extending over the outermost four feet.

The frictional surfaces 34 are disposed in relatively non-bulging contours on the outer cylindrical surfaces of the crop-severing rods 30b. Thus, the portions of the crop-severing rods 30b which is covered by the frictional surfaces 34 have no significantly abruptly enlarged areas or bulges which might impact against premature crops and sever them prematurely. Instead, the frictional surfaces 34 have substantially linear or straight longitudinal surfaces from inner portions 35 thereof to at or near the outer ends 36 thereof. Advantageously, to ease insertion of the crop-severing rods 30b into foliage, a portion of the frictional surfaces 34 adjacent the outer ends 36 thereof, e.g. about the outermost six inches of the frictional surfaces 34, can be tapered as depicted in FIG. 6, for example being tapered to minimum diameters slightly greater than the diameters of the central support members 32, say minimum diameters in the order of about one and one-fourth inches so that the frictional surfaces 34 have minimum thickness in the order of about one-eighth inch.

FIG. 8 illustrates a crop-severing rod 30c incorporating modifications over crop-severing rod 30b of FIGS. 6 and 7. Rod 30c is tapered over all or substantially all of its length from an inner portion 35 thereof to at or near outer end 36 thereof, and likewise, if desired, the outermost portion 36 of rod 30c can be further tapered and can be tapered substantially to a point, as shown in FIG. 8. In addition, rod 30c is of a one-piece construction, being formed of a frictional material such as rubber, rather than the inner rod and outer surface construction of crop-severing rod 30b of FIGS. 6 and 7. Like rod 30b, crop-severing rod 30c has a substantially linear or straight longitudinal surface from inner portion 35 to at or near the outer end 36 with no significantly abruptly enlarged areas or bulges.

Crop-severing rods 30b of FIGS. 6 and 7 and 30c of FIG. 8 are rotated to engage and sever the crops, for example with a crop-severing rod 30b or 30c contacting each side of the fruit while rotating at speeds in the range of from about 300 to about 1000 RPM.

Figure 9:
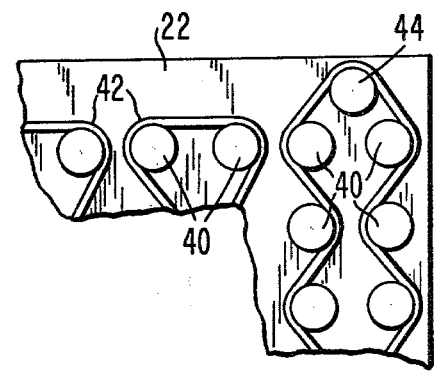
FIGS. 9 and 10 illustrate alternative manners of driving crop-severing rods for rotation with the rods mounted in in accordance with the present invention.
Figure 10:
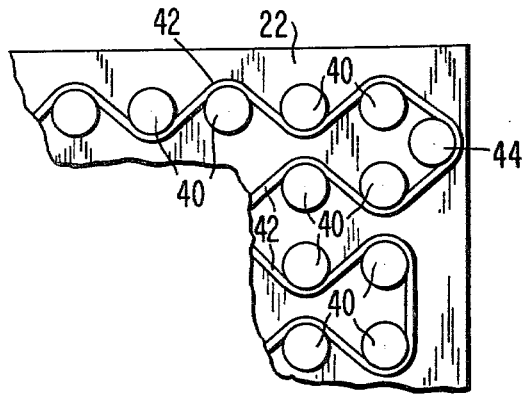
Figure 11:
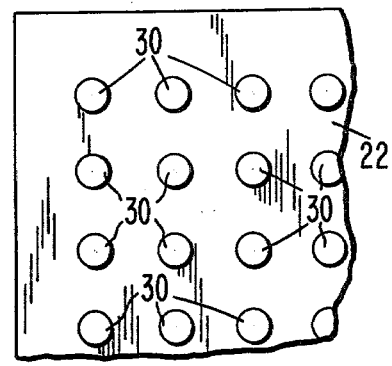
FIG. 11 is a view similar to FIG. 3 but depicting the mounting of crop-severing rods in a second relationship on a crop harvesting apparatus in accordance with the present invention.

Preferably crop-severing rods 30 are mounted in at least three horizontal rows on support plate 22. Each crop-severing rod 30 is rotatably mounted on support plate 22, for example by means of a bearing assembly 38. The rods 30 can be driven from a drive source by suitable means, for example gears such as gear 40a of FIG. 4, or pulleys such as pulleys 40b of FIGS. 6 and 8. Preferably, the adjacent rods 30 of each horizontal row are driven to rotate in the same direction, as illustrated by pulleys 40 and belt 42 in FIG. 9, in which case the fruit is twisted as it is contacted on each side by a crop-severing rod 30. Alternatively, if desired, the adjacent rods 30 of each horizontal row may be driven to rotate in opposite directions, as illustrated by pulleys 40 and belt 42 in FIG. 10, in which case the fruit is pulled from the trees as it is contacted on each side by a rod 30. Preferably all the rods 30 mounted from plate 22 are rotated. Preferably, also, the horizontal rows are laid out so that vertically adjacent rods 30 are staggered, as depicted in FIG. 3; however, if desired the vertically adjacent rods can be aligned as depicted in FIG. 11.

As many as 150 or more crop severing rods 30 might be mounted on plate 22, spaced at distances appropriate for the particular crop to be harvested, i.e. spaced with a minimum edge-to-edge clearance in any direction sufficient to assure engaging and severing the mature crops while not severing or damaging immature crops or foliage. By way of example, for harvesting of Valencia oranges, which have both a mature crop and an immature green crop on the tree at the same time, a minimum edge-to-edge clearance in the order of about two-and-three-fourths inches may be provided so that the immature crop, leaves and branches pass between the crop severing rods without being removed from the trees, while the mature crops are contacted and are removed from the trees.

To harvest tree borne crops, crop harvesting device 10 is generally thrust into a crop-bearing plant, with the longitudinal axes of the crop-severing rods 30 substantially parallel to the direction of thrust, and gears 40a or pulleys 40b are driven to rotate crop-severing rods 30. As the crops are contacted by rods 30, the crops are removed from the crop-bearing plants, allowing the crops to fall to a crop-catcher or other suitable receptacle.

Although the present invention has been described with reference to preferred embodiments, numerous modifications and re-arrangements could be made, and still the result would be within the scope of the invention.

What is claimed is:

1. A crop harvesting apparatus comprising:
   a plurality of flexible, crop-severing rods having longitudinal axes and substantially circular cross-sections, said crop-severing rods having substantially straight longitudinal surfaces over the length thereof; said rods being made of material such that at rotational speeds of about 1000 to about 3000 rpm said rods flex and thereby transcribe orbital paths about the stationary positions of their respective longitudinal axes;
   support means for rotatably supporting said crop-severing rods with their longitudinal axes substantially parallel, said crop-severing rods being mounted for rotation about their own longitudinal axes at speeds such that said rods flex and rotate orbitally about the stationary portions of their respective longitudinal axes, and said rods having a minimum edge-to-edge clearance such that immature crop may pass between said rods; and drive means for rotating said crop-severing rods at rotational speeds between about 1000 and about 3000 rpm at which said crop-severing rods flex and thereby transcribe orbital paths about the stationary positions of their respective longitudinal axes.

2. A crop harvesting apparatus as claimed in claim 1 in which said support means is connected to the first ends of said crop-severing rods and in which the second ends of said crop-severing rods are tapered.

3. A crop harvesting apparatus as claimed in claim 2 in which the second ends of said crop-severing rods are tapered for a length in the order of about six inches.

4. A crop harvesting apparatus as claimed in claim 1 in which said support means is connected to the first ends of said crop-severing rods and in which said crop-severing rods are substantially uniformly tapered from a greater diameter adjacent the first ends thereof to a lesser diameter adjacent the second ends thereof.

5. A crop harvesting apparatus as claimed in claim 4 in which said crop-severing rods are further tapered adjacent the second ends thereof.

6. A crop harvesting apparatus as claimed in claim 1 in which said drive means rotates the rods of any one horizontal row in the same rotational direction.

7. A crop harvesting apparatus as claimed in claim 1 in which said drive means rotates horizontally adjacent crop-severing rods in opposite rotational directions.

8. A crop harvesting apparatus as claimed in claim 1 in which the surfaces of said crop-severing rods are formed of rubber.

9. A crop harvesting apparatus as claimed in claim 1 in which said support means supports said crop-severing rods with a minimum edge-to-edge clearance in the order of about two and three-fourths inches.

10. A crop harvesting apparatus as claimed in claim 1 in which said crop-severing rods have a diameter in the order of about one and one-half inch and said support means supports said crop-severing rods spaced on about four inch centers.

11. A crop harvesting apparatus as claimed in claim 1 in which said support means supports said crop-severing rods with vertically adjacent crop-severing rods aligned.

12. A crop harvesting apparatus as claimed in claim 1 in which said support means supports said crop-severing rods with vertically adjacent crop-severing rods staggered.

13. A crop harvesting apparatus as claimed in claim 1 in which said drive means rotates all the crop-severing rods.

14. A crop harvesting apparatus comprising:
a plurality of flexible, crop-severing rods having longitudinal axes, substantially circular cross-sections, and substantially straight longitudinal surfaces over the length thereof, said rods having a central member of synthetic resinous material and an outer frictional surface for contacting said crop;
support means for rotatably supporting said crop-severing rods with their longitudinal axes substantially parallel, said crop-severing rods being mounted for rotation about their own longitudinal axes at speeds such that said rods flex and rotate orbitally about the stationary positions of their respective longitudinal axes, and said rods having a minimum edge-to-edge clearance such that immature crop may pass between said rods; and
drive means for rotating said crop-severing rods at rotational speeds at which said crop-severing rods flex and thereby transcribe orbital path about the stationary positions of their respective longitudinal axes.

15. A crop harvesting apparatus as claimed in claim 14 in which the synthetic resinous composition includes glass fibers.

16. A crop harvesting apparatus as claimed in claim 14 in which said crop-severing rods are thermoplastic polycarbonate rods.

17. A crop harvesting apparatus as claimed in calim 14 further comprising a self-propelled vehicle; mounting means mounting said support means on said self-propelled vehicle for insertion of said crop-severing rods among crop-bearing foliage of a crop-bearing plant for harvesting of crops therefrom; and control means for controlling movement of said self-propelled vehicle and said crop-severing rods.

18. A crop harvesting apparatus as claimed in claim 14 in which said crop-severing rods are thermoplastic polycarbonate rods.

19. A crop harvesting apparatus as claimed in claim 14 in which said crop-severing rods are substantially uniformly tapered over the length of the frictional surfaces.

20. A crop harvesting apparatus as claimed in claim 19 in which said frictional surface is further tapered adjacent one end thereof.

21. A crop harvesting apparatus as claimed in claim 14 in which said support means supports said crop-severing rods in a plurality of horizonal rows.

22. A crop harvesting apparatus as claimed in claim 21 in which said drive means rotates the rods of any one horizontal row in the same rotational direction.

23. A crop harvesting apparatus as claimed in claim 21 in which said drive means rotates horizontally adjacent crop-severing rods in opposite rotational directions.

24. A crop harvesting apparatus as claimed in claim 21 in which said support means supports said crop-severing rods in at least three horizontal rows.

25. A crop harvesting apparatus as claimed in claim 21 in which said support means supports said crop-severing rods with vertically adjacent crop-severing rods aligned.

26. A crop harvesting apparatus as claimed in claim 21 in which said support means supports said crop-severing rods with vertically adjacent crop-severing rods staggered.

27. A crop harvesting apparatus as claimed in claim 14 in which said support means supports said crop-severing rods with a minimum edge-to-edge clearance in the order of about two and three-fourths inches.

28. A crop harvesting apparatus as claimed in claim 14 in which said drive means rotates all the crop-severing rods.

29. A crop harvesting apparatus comprising:
a plurality of flexible, crop-severing rods having longitudinal axes and substantially circular cross-sections, said crop-severing rods including flexible support members of synthetic resinous material and rubber frictional surfaces having substantially straight longitudinal surfaces over the length thereof, said crop-severing rods being mounted for rotation about their own longitudinal axes;
support means for rotatably supporting said crop-severing rods in at least three horizontal rows with the longitudinal axes of the crop-severing rods substantially parallel and with a minimum edge-to-edge clearance between adjacent crop-severing rods in the order of about two and three-quarters inches; and drive means for rotating said crop-severing rods at speeds of from about 300 to about 1000 RPM at which said crop-severing rods flex and thereby transcribe orbital paths about the stationary positions of their longitudinal axes.

30. A crop harvesting apparatus as claimed in claim 29 in which said drive means rotates all the crop-severing rods.

31. A crop harvesting apparatus as claimed in claim 29 in which said drive means rotates the rods of any one horizontal row in the same rotational direction.

32. A crop harvesting apparatus as claimed in claim 29 in which said drive means drives horizontally adjacent crop-severing rods in opposite rotational directions.

33. A crop harvesting apparatus as claimed in claim 29 in which said support means supports said crop-severing rods with vertically adjacent crop-severing rods aligned.

34. A crop harvesting apparatus as claimed in claim 29 in which said support means supports said crop-severing rods with vertically adjacent crop-severing rods staggered.

35. A crop harvesting apparatus as claimed in claim 34 in which said drive means rotates the rods of any one horizontal row in the same rotational direction.

36. A crop harvesting apparatus as claimed in claim 34 in which said drive means drives horizontally adjacent crop-severing rods in opposite rotational directions.

37. A crop harvesting apparatus as claimed in claim 29 in which the synthetic resinous composition includes glass fibers.

* * * * *